United States Patent
Huang (10) Patent No.: US 9,964,843 B2
(45) Date of Patent: May 8, 2018

(54) LIGHT-PROVIDING DEVICE AND PROJECTION SYSTEM

(71) Applicant: Delta Electronics, Inc., Taoyuan (TW)

(72) Inventor: June-Jei Huang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 117 days.

(21) Appl. No.: 15/000,525

(22) Filed: Jan. 19, 2016

(65) Prior Publication Data
US 2017/0102607 A1    Apr. 13, 2017

(30) Foreign Application Priority Data
Oct. 8, 2015   (TW) .............. 104133154 A (51) Int. Cl.
*G03B 21/14* (2006.01)
*G02B 27/14* (2006.01)
(Continued)

(52) U.S. Cl.
CPC ......... *G03B 21/208* (2013.01); *G02B 27/141* (2013.01); *G02B 27/149* (2013.01);
(Continued)

(58) Field of Classification Search
CPC ............ G03B 21/2033; G03B 21/204; G03B 21/208; G03B 21/003; G03B 21/005;
(Continued)

(56) References Cited

U.S. PATENT DOCUMENTS 8,388,190 B2 * 3/2013 Li .................. G02B 6/0008
362/296.01
2005/0243570 A1 * 11/2005 Chaves .............. G02B 19/0028
362/551
(Continued)

FOREIGN PATENT DOCUMENTS

CN    101135833 A    3/2008
CN    101151908 A    3/2008
(Continued)

OTHER PUBLICATIONS

Office Action dated Aug. 24, 2017 in corresponding TW application No. 104133154 (10 pgs).
(Continued)

*Primary Examiner* — William C Dowling
(74) *Attorney, Agent, or Firm* — Muncy, Geissler, Olds & Lowe, P.C.

(57) ABSTRACT

A light-providing device is provided, including a light guiding member, an LED (light-emitting diode), and a light distribution adjusting member, wherein the LED is disposed on the light guiding member. The light guiding member has an opening. The light distribution adjusting member has an inlet and an outlet. The inlet is connected to the opening. The shape or dimensions of the inlet is different from that of the outlet. A plurality of lights generated by the LED enter the light distribution adjusting member through the opening and the inlet, and leave the light distribution adjusting member through the outlet. The lights include a first light angular distribution at the inlet, and include a second light angular (Continued)

distribution at the outlet, wherein the second light angular distribution/the first light angular distribution is proportional to the inlet/the outlet.

20 Claims, 10 Drawing Sheets

(51) Int. Cl.
   *G03B 21/20* (2006.01)
   *G03B 21/00* (2006.01)
   *H04N 9/31* (2006.01)
   *G03B 33/12* (2006.01)

(52) U.S. Cl.
   CPC ......... *G03B 21/005* (2013.01); *G03B 21/008* (2013.01); *G03B 21/204* (2013.01); *G03B 21/2066* (2013.01); *H04N 9/3197* (2013.01); *G03B 33/12* (2013.01)

(58) Field of Classification Search
   CPC ......... G03B 21/006; F21K 9/56; H01L 33/50; H04N 9/31; H04N 9/3111; H04N 9/3108; F21Y 2113/005; F21Y 2113/003
   USPC .................. 362/551, 554, 555, 293, 21, 84; 359/652–654
   See application file for complete search history.

(56) References Cited

U.S. PATENT DOCUMENTS

| | | | |
|---|---|---|---|
| 2007/0081336 A1* | 4/2007 | Bierhuizen | H04N 9/315 362/293 |
| 2008/0013911 A1* | 1/2008 | Jennings | G02B 6/00 385/146 |
| 2009/0128781 A1* | 5/2009 | Li | G02B 6/0008 353/20 |
| 2010/0220306 A1 | 9/2010 | Malach et al. | |
| 2012/0063160 A1* | 3/2012 | Frankiewicz | F21L 4/00 362/555 |

FOREIGN PATENT DOCUMENTS

| | | |
|---|---|---|
| CN | 104345531 A | 2/2015 |
| TW | M269407 | 7/2005 |
| TW | 200608055 A | 3/2006 |
| TW | 201326683 A | 7/2013 |
| TW | 201502587 A | 1/2015 |

OTHER PUBLICATIONS

Chinese Office Action in application No. 201510644244.8 dated Feb. 1, 2018; pp. 1-10.

* cited by examiner

LIGHT-PROVIDING DEVICE AND PROJECTION SYSTEM

CROSS REFERENCE TO RELATED APPLICATIONS

The present application is based on, and claims priority from, Taiwan Patent Application No. 104133154, filed on Oct. 8, 2015, the disclosure of which is hereby incorporated by reference herein in its entirety.

BACKGROUND OF THE DISCLOSURE

Field of the Disclosure

The application relates in general to a light-providing device, and in particular, to a light-providing device for reducing etendue and adjusting light angular distribution.

Description of the Related Art

A conventional projection system having an autostereoscopy function usually provides light by using a laser. However, a projection system using a laser is costly, and eyes may be injured by the laser. Therefore, a projection system having an autostereoscopy function is presently not widespread.

A light-emitting diode (LED) is a semiconductor electronic member which can emit light. Modern LEDs are available across the visible, ultraviolet, and infrared wavelengths, with very high brightness. When a projection system uses LEDs as a light source, some problems may occur, such as the projected image being unclear because of the large etendue, or the light provided by the LEDs not being able to pass through a lens. Thus, how to use the LEDs to be a light source in a projection system has become an important issue.

BRIEF SUMMARY OF DISCLOSURE

To address the deficiencies of conventional electronic products, an embodiment of the disclosure provides a light-providing device, including a light guiding member, an LED (light-emitting diode), and a light distribution adjusting member, wherein the LED is disposed on the light guiding member. The light guiding member has an opening. The light distribution adjusting member has an inlet and an outlet. The inlet is connected to the opening. The shape or dimensions of the inlet is different from that of the outlet. A plurality of lights generated by the LED enter the light distribution adjusting member through the opening and the inlet, and leave the light distribution adjusting member through the outlet. The lights include a first light angular distribution at the inlet, and include a second light angular distribution at the outlet, wherein the second light angular distribution/the first light angular distribution is proportional to the inlet/the outlet.

In some embodiments, the light guiding member has a prism structure and comprises a plurality of phosphors, the phosphors are distributed over the light guiding member, and the LED is attached on the prism structure, wherein at least a part of the light is generated by the phosphors excited by the LED.

In some embodiments, the light guiding member comprises a first end and a second end opposite to the first end, wherein the dimensions of the first end exceed that of the second end, and the opening is formed at the second end.

In some embodiments, the light distribution adjusting member comprises a compound parabolic concentrator structure.

In some embodiments, the cross-section area of the inlet is less than that of the outlet.

In some embodiments, the outlet has a rectangular cross-section.

In some embodiments, the LED is an ultraviolet LED or a blue LED.

In some embodiments, the phosphors are red phosphors, green phosphors, blue phosphors, or yellow phosphors.

In some embodiments, the light guiding member has a domed structure, and comprises a substrate and a domed cover, wherein the domed cover is connected to the substrate, the opening is formed on the domed cover, and the LED is disposed between the substrate and the domed cover.

In some embodiments, the domed cover has an arched cross-section or a parabolic cross-section.

In some embodiments, the opening is formed on the center of the domed cover.

In some embodiments, the LED is disposed on the substrate corresponding to the opening.

In some embodiments, the light guiding member further comprises a coated film, disposed on an emitting surface of the LED.

In some embodiments, the cross-section area of the outlet is less than that of the inlet.

In some embodiments, the outlet has a rectangular cross-section.

In some embodiments, the LED is a red LED, a green LED, or a blue LED.

An embodiment of the disclosure further provides a projection system, including one or a plurality of aforementioned light-providing devices, a light combining module, a condenser lens, a deflecting mirror, and an image device. The lights from the light-providing devices form a white light, and the white light passes through the condenser lens and forms a plurality of parallel images in the image device by the deflecting mirror.

In some embodiments, the light combining module comprises an X-cube.

In some embodiments, the image device comprises a Philips prism and a plurality of digital micromirror devices.

BRIEF DESCRIPTION OF DRAWINGS

The disclosure can be more fully understood by reading the subsequent detailed description and examples with references made to the accompanying drawings, wherein.

DETAILED DESCRIPTION OF DISCLOSURE

The making and using of the embodiments of the light-providing device and the projection system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
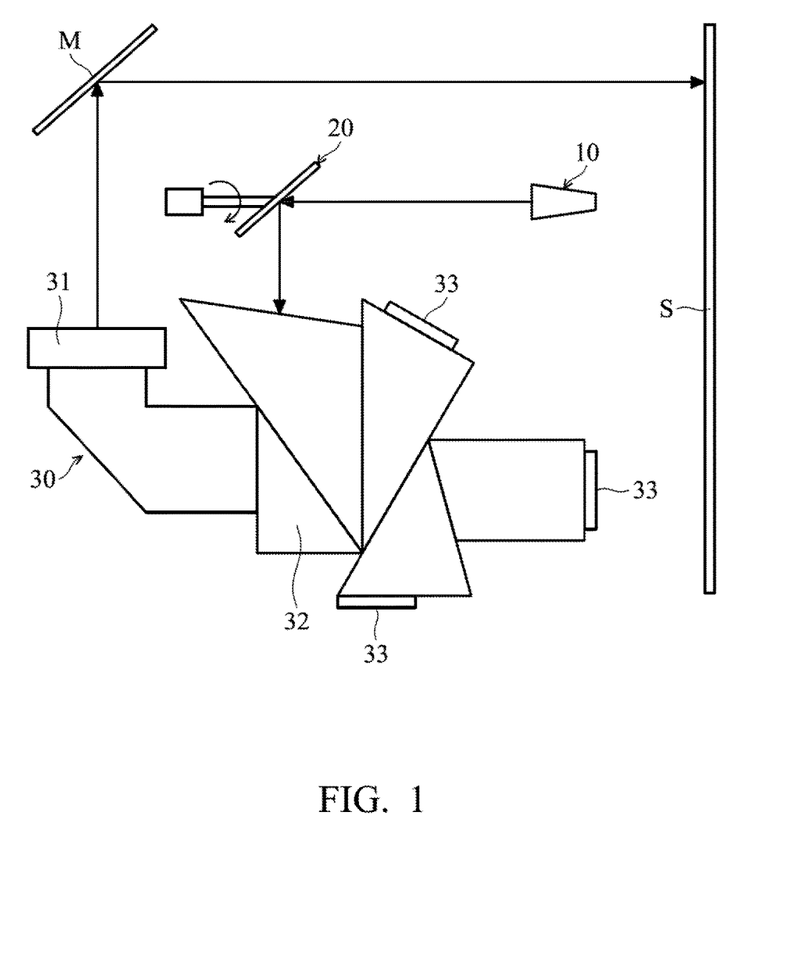
FIG. 1 is a schematic diagram of a projection system according to an embodiment of the disclosure.

As shown in FIG. 1, a projection system in an embodiment of the disclosure primarily comprises a light source 10, a deflecting mirror 20, an image device 30, and a reflective mirror M. The light source 10 can emit a white light to the deflecting mirror 20. The deflecting mirror 20 is driven by a voice coil motor and scans the white light, such that a plurality of parallel images are obtained by the image device 30. Subsequently, the image device 30 projects the parallel images to a screen S. It should be noted that each of the parallel images has a different polarization effect, and is projected onto a different position on the screen S. Therefore, a three-dimensional visual impression can be generated to a user in front of the screen S without using other auxiliary tools (3D glass, for example).

In this embodiment, the white light can be scanned by the deflecting mirror 20 and forms four parallel images in the image device 30. Thus, the parallel images can pass through the lens 31 of the image device 30 with ample space. In some embodiments, the white light can be scanned by the deflecting mirror 20 and forms three to twenty parallel images (fifteen for example) in the image device 30. Furthermore, the image device 30 can comprise a Philips prism 32 and a plurality of digital micromirror devices 33 (DMD).

The reflective mirror M is used to reflect and guide the white light. The number, the position, and the angle of the reflective mirror M can be adjusted as required, and are not limited to those illustrated in FIG. 1.

Figure 2:
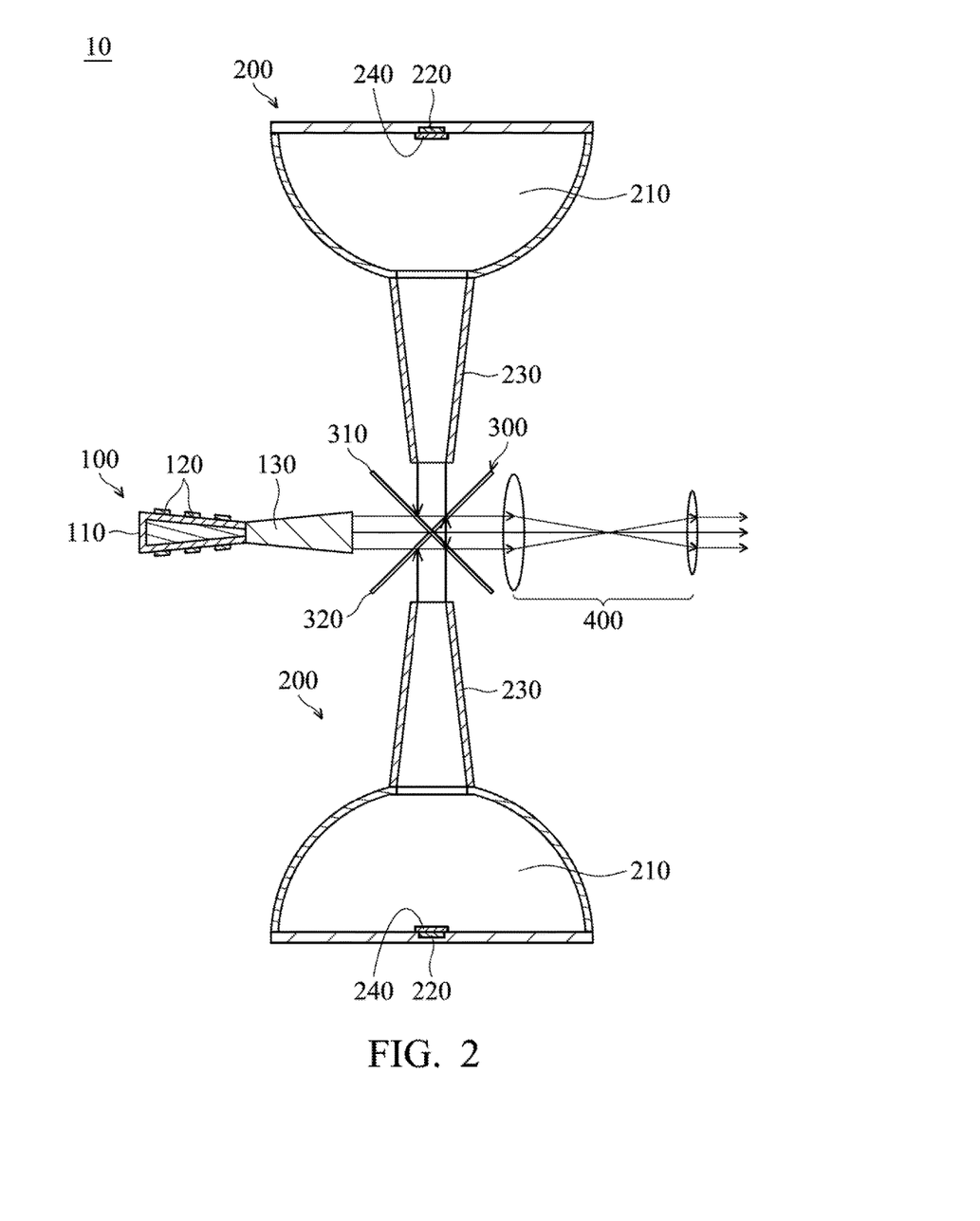
FIG. 2 is a schematic diagram of a light source according to an embodiment of the disclosure.

Referring to FIG. 2, the light source 10 can comprise a plurality of light-providing devices 100 and 200, a light combining module 300, and a condenser lens 400. In this embodiment, the light combining module 300 comprises an X-cube having a red light reflecting optical filter 310 and a blue light reflecting optical filter 320. The light combining module 300 can mix the lights from the light-providing devices 100 and 200 to a white light, and this white light can be emitted to the deflecting mirror 20. The deflecting mirror 20 can scan the white light.

Figure 3:
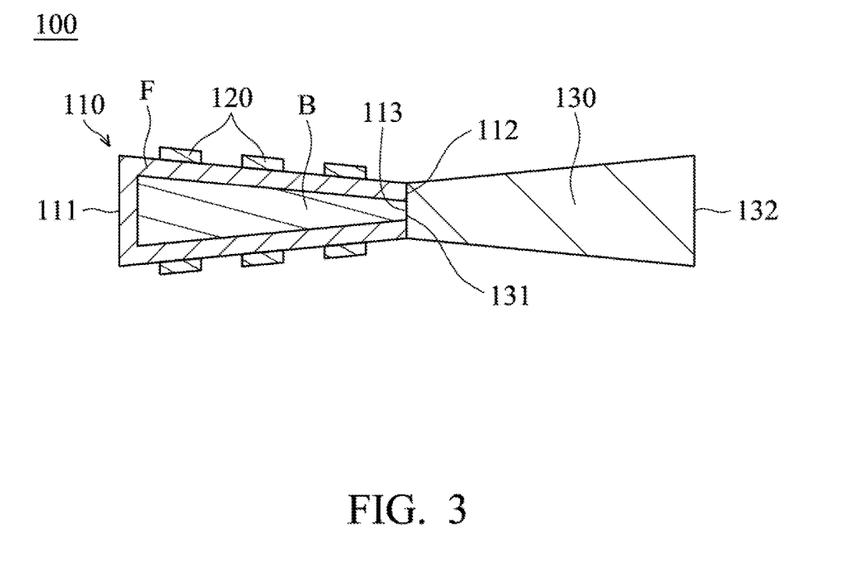
FIG. 3 is a schematic diagram of a light-providing device according to an embodiment of the disclosure.

As shown in FIG. 3, the light-providing device 100 comprises a light guiding member 110, a plurality of light-emitting diodes 120 (LEDs), and a light distribution adjusting member 130. The light guiding member 110 has a prism structure and comprises a main body B and a dichroic filter F, and has a first end 111 and a second end 112 opposite to the first end 111. The dimensions of the first end 111 exceed those of the second end 112. The dichroic filter F is coated on the walls of the main body B except a side wall of the main body B at the second end 112. Therefore, an opening 113 is formed at the second end 112. The LEDs 120 are attached on the dichroic filter F of the light guiding member 110, and disposed between the first end 111 and the second end 112.

The phosphors are distributed over the main body B of the light guiding member 110. When an external power is provided to the LEDs 120, the LEDs 120 can excite the light guiding member 110 to emit light. Moreover, the light from the LEDs 120 is the only light which can pass through the dichroic filter F. The light emitted from the light guiding member 110 can merely leave through the opening 113, and the opening 113 has small dimensions, such that the light leaving from the opening 113 has small etendue.

Referring to FIG. 3, the light distribution adjusting member 130 has an inlet 131 and an outlet 132. The inlet 131 and the outlet 132 are respectively disposed on the opposite sides of the light distribution adjusting member 130, and the inlet 131 is connected to the opening 113 of the light guiding member 110.

Figure 4A:
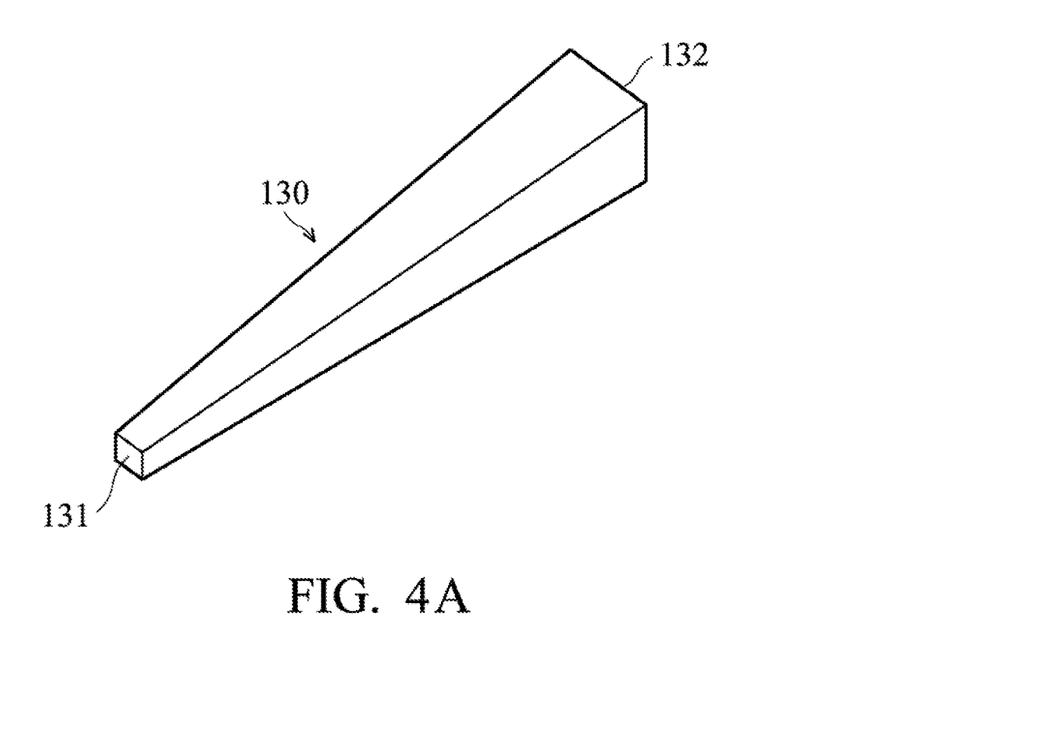
FIG. 4A is a schematic diagram of a light distribution adjusting member according to an embodiment of the disclosure.
Figure 4B:
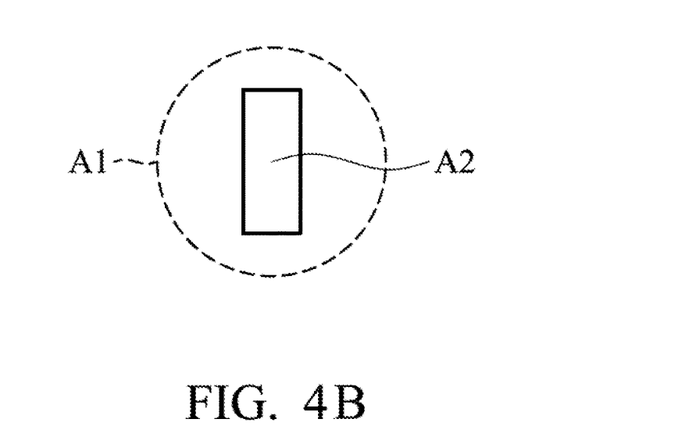
FIG. 4B is a schematic diagram of the light angular distributions at the inlet and the outlet according to an embodiment of the disclosure.

Referring to FIG. 4A, in this embodiment, the light distribution adjusting member 130 has a prism structure. Both the inlet 131 and the outlet 132 have rectangular cross-sections, and the cross-section area of the inlet 131 is less than that of the outlet 132. The light angular distribution can be adjusted by the aforementioned structure to a suitable condition in the projection system. As shown in FIG. 4B, when the opening 113 of the light guiding member 110 is shaped as a circle, the lights entering the inlet 131 have a circular first light angular distribution A1. When the lights reach the walls of the light distribution adjusting member 130, the lights are reflected thereby. After the lights are reflected several times, the lights leaving from the outlet 132 substantially have a rectangular second light angular distribution A2. The dimensions of the second light angular distribution A2 are less than that of the first light angular distribution A1. In other words, the second light angular distribution A2/the first light angular distribution A1 is proportional to the inlet 131/the outlet 132.

Figure 5:
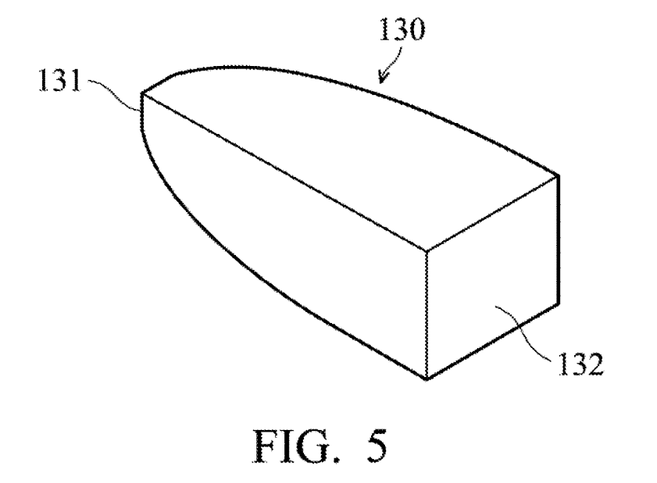
FIG. 5 is a schematic diagram of a light distribution adjusting member according to another embodiment of the disclosure.

As shown in FIG. 5, in another embodiment of the disclosure, the light distribution adjusting member 130 can include a compound parabolic concentrator structure (CPC). The length of the light distribution adjusting member 130 can be reduced. It should be noted that the shape and the dimensions of the second light angular distribution A2 are related to the inlet 131 and the outlet 132, such that the dimensions and the shape of the inlet 131 and the outlet 132 can be adjusted as required. Furthermore, the number of LEDs 120 can also be adjusted as required.

In this embodiment, the light-providing device 100 provides a green light. The light guiding member 110 comprises green phosphors, and the LEDs 120 are the blue LEDs or the ultraviolet LEDs. In some embodiments, the light-providing device 100 can provide red light, blue light, or yellow light when the light guiding member 110 comprises red phosphors, blue phosphors, or yellow phosphors correspondingly. In some embodiments, the light-providing device 100 can directly provide a white light. The light guiding member 110 comprises yellow phosphors, and the LEDs 120 are blue LEDs and disposed in the main body B. Therefore, the lights (blue lights) from the LEDs can excite the yellow phosphors to emit yellow lights and mix with the yellow lights to produce the white light. It should be noted that, when the light-providing device 100 directly provides the white light, the light-providing devices 200 can be omitted. That is, the projection system merely comprises a single light-providing device 100. Furthermore, the light combining module 300 can also be omitted.

Figure 6:
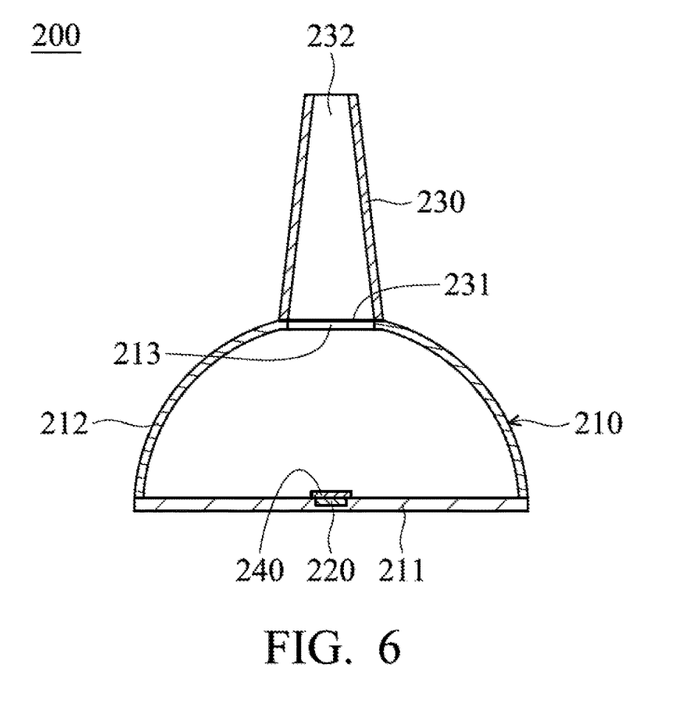
FIG. 6 is a schematic diagram of a light-providing device according to another embodiment of the disclosure.

Referring to FIG. 6, similar to the light-providing device 100, the light-providing device 200 comprises a light guiding member 210, an LED 220, and a light distribution adjusting member 230. The light guiding member 210 has a domed structure, including a substrate 211 and a domed cover 212. An opening 213 is formed on the center of the domed cover 212. The LED 220 is disposed on the substrate 211, between the substrate 211 and the domed cover 212, and corresponded to the opening 213. Furthermore, a coated film 240 is formed on the emitting surface of the LED 220. When the light contacts the coated film 240, an irregular reflection may occur.

In this embodiment, the domed cover 212 has a semicircular cross-section. Thus, the lights emitted from the LED 220 are reflected back to the position of the LED 220 after contact the domed cover 212. A part of the light reflected from the domed cover 212 is reflected by the coated film 240 and pass through the opening 213, and then leave the light guiding member 210. The remaining lights are reflected repeatedly until passing through the opening 213.

Figure 7:
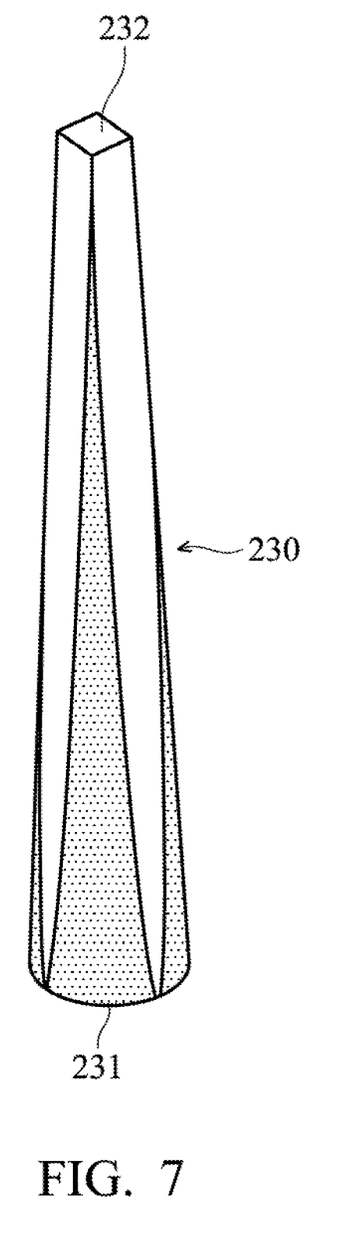
FIG. 7 is a schematic diagram of a light distribution adjusting member according to another embodiment of the disclosure.

Referring to FIGS. 6 and 7, the light distribution adjusting member 230 comprises an inlet 231 and an outlet 232. The inlet 231 and the outlet 232 are respectively disposed on the opposite sides of the light distribution adjusting member 230, and the inlet 231 is connected to the opening 213 of the light guiding member 210. The inlet 231 has a circular cross-section corresponding to the opening. The outlet 232 has a rectangular cross-section. The cross-section area of the outlet 232 is less than that of the inlet 231. Since the lights can merely leave the light distribution adjusting member 230 through the outlet 232, and the outlet 232 has small dimensions and a specific shape (such as a rectangular shape), the lights leaving from the outlet 232 can keep small etendue . That is, the lights at the inlet 231 have a first light angular distribution, and the lights at the outlet 232 have a second light angular distribution, wherein the second light angular distribution exceeds the first light angular distribution. The second light angular distribution/the first light angular distribution is proportional to the inlet 231/the outlet 232. Specifically, the light angular distributions at the outlet 132 and the outlets 232 are substantially the same for facilitating the mixture by the light combining module 300.

As shown in FIG. 2, in this embodiment, the projection system has two light-providing devices 200, respectively providing red light and blue light. The LEDs 220 disposed therein are the red LED and the blue LED respectively. In some embodiments, the projection system can comprise a light-providing device 200 for providing green light, and the LED 220 therein is green LED.

Figure 8A:
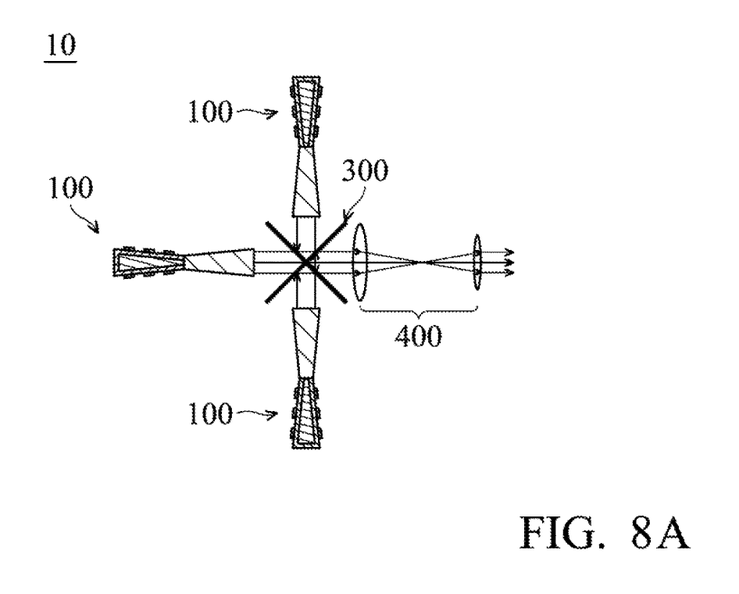
FIG. 8A is a schematic diagram of a light source according to another embodiment of the disclosure.
Figure 8B:
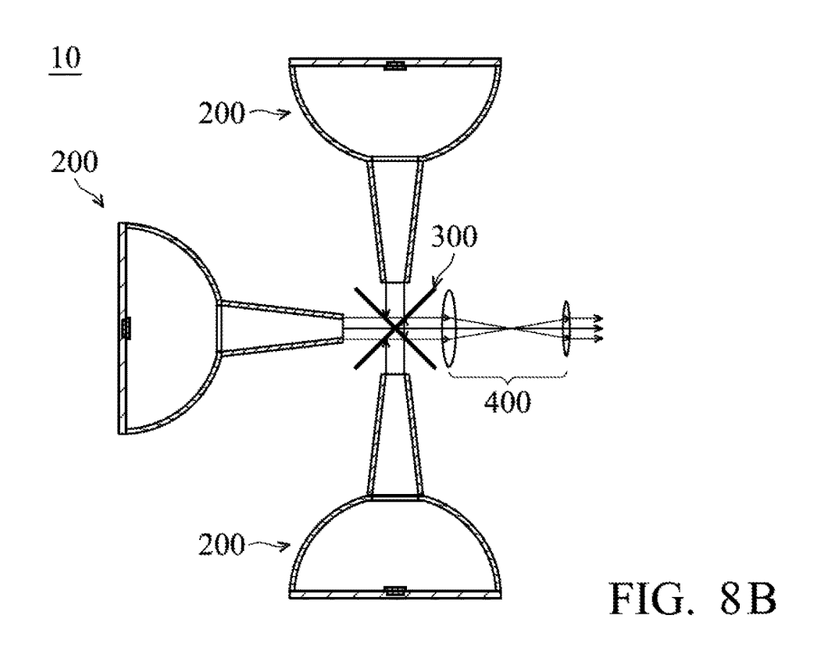
FIG. 8B is a schematic diagram of a light source according to another embodiment of the disclosure.
Figure 8C:
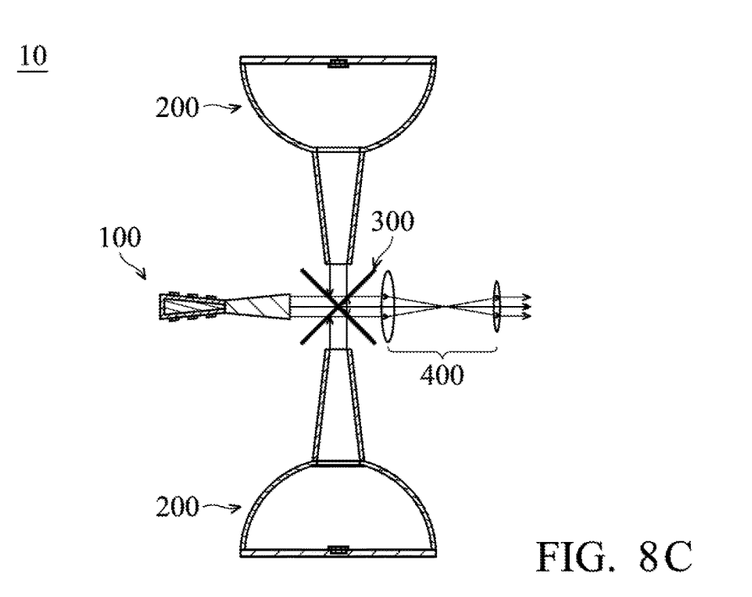
FIG. 8C is a schematic diagram of a light source according to another embodiment of the disclosure.
Figure 8D:
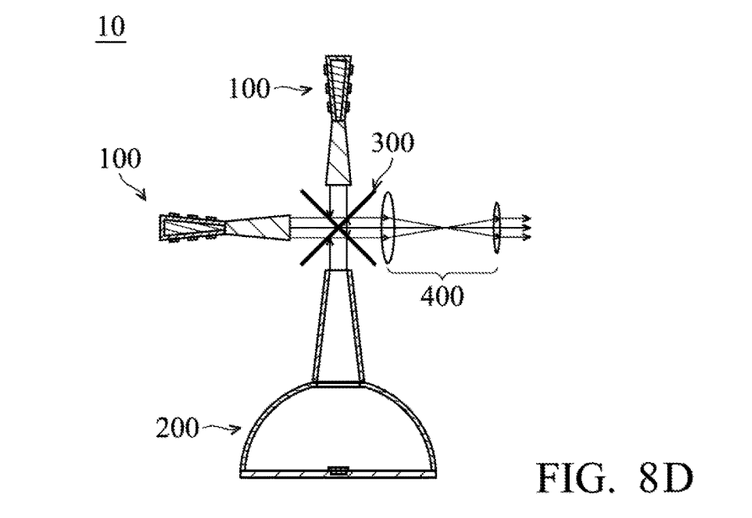
FIG. 8D is a schematic diagram of a light source according to another embodiment of the disclosure.

In different projection systems, the number of light-providing devices 100 and light-providing devices 200 in the light source 10 can be different. As shown in FIG. 8A, in some embodiments, the light source 10 comprises three light-providing devices 100, respectively providing red light, blue light, and green light. As shown in FIG. 8B, in some embodiments, the light source 10 comprises three light-providing devices 200, respectively providing red light, blue light, and green light. As shown in FIG. 8C, in some embodiments, the light source 10 comprises one light-providing device 100 and two light-providing devices 200, wherein when the light-providing device 100 provides green light, two light-providing devices 200 respectively and correspondingly provides red light and blue light. As shown in FIG. 8D, in some embodiments, the light source 10 comprises two light-providing devices 100 and one light-providing device 200, wherein when the light-providing device 200 provides blue light, two light-providing devices 100 respectively and correspondingly provides red light and green light.

Figure 8E:
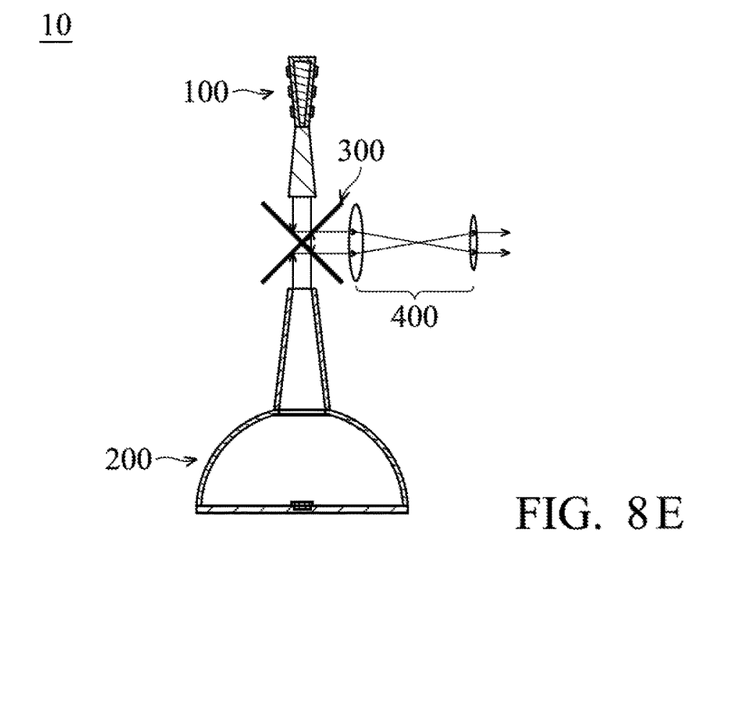
FIG. 8E is a schematic diagram of a light source according to another embodiment of the disclosure.
Figure 8F:
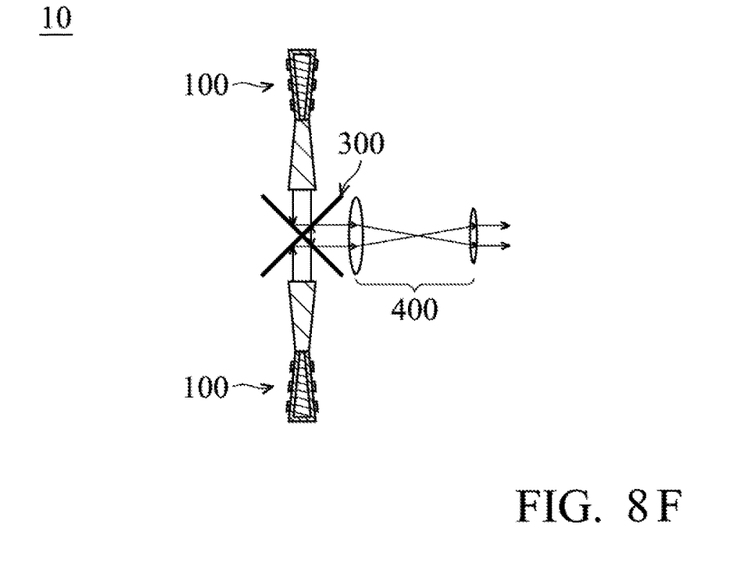
FIG. 8F is a schematic diagram of a light source according to another embodiment of the disclosure.
Figure 8G:
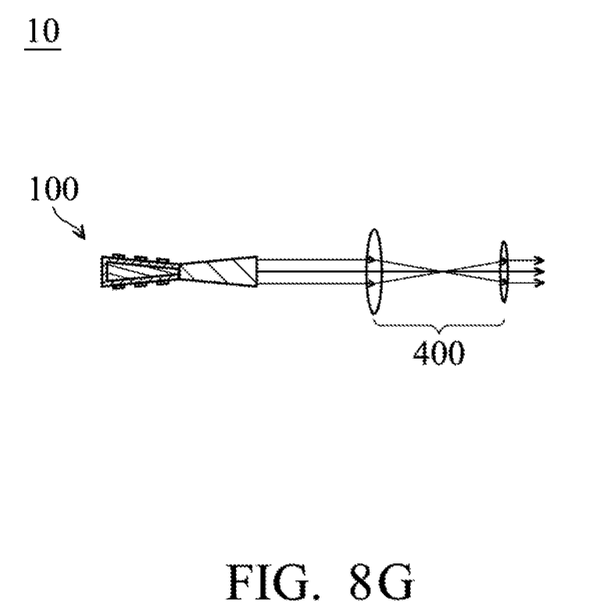
FIG. 8G is a schematic diagram of a light source according to another embodiment of the disclosure.

As shown in FIG. 8E, in some embodiments, the light source 10 comprises one light-providing device 100 and one light-providing device 200, wherein the light-providing device 100 provides yellow light and the light-providing device 200 provides blue light. As shown in FIG. 8F, in some embodiments, the light source 10 comprises two light-providing devices 100. One of the light-providing devices 100 provides blue light, and another one provides yellow light. As shown in FIG. 8G, in some embodiments, the light source 10 merely comprises a single light-providing device 100, directly providing a white light. The light combining module 300 can be omitted.

In summary, a light-providing device and a projection system is provided in the disclosure. Since the light source comprises the light guiding member and the light distribution adjusting member, the lights emitted from the LEDs can include small etendue and suitable light angular distribution, and the uniform light source can be achieved. Therefore, the autostereoscopy projection and the related industry can be facilitated.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it is to be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A light-providing device, comprising:
   a light guiding member, comprising an opening;
   an LED, disposed on the light guiding member, wherein the light guiding member has a prism structure and comprises a plurality of phosphors, the phosphors are distributed over the light guiding member, and the LED is attached on the prism structure, wherein at least a part of the light is generated by the phosphors excited by the LED; and
   a light distribution adjusting member, comprising an inlet and an outlet, wherein the inlet is connected to the opening, and the shape or dimensions of the inlet is different from that of the outlet, wherein a plurality of lights generated by the LED enter the light distribution adjusting member through the opening and the inlet, and leave the light distribution adjusting member through the outlet, wherein the lights include a first light angular distribution at the inlet, and include a second light angular distribution at the outlet, and the second light angular distribution/the first light angular distribution is proportional to the inlet/the outlet.

2. The light-providing device as claimed in claim 1, wherein the light guiding member comprises a first end and a second end opposite to the first end, wherein the dimensions of the first end exceed that of the second end, and the opening is formed at the second end.

3. The light-providing device as claimed in claim 1, wherein the light distribution adjusting member comprises a compound parabolic concentrator structure.

4. The light-providing device as claimed in claim 1, wherein the cross-section area of the inlet is less than that of the outlet.

5. The light-providing device as claimed in claim 1, wherein the outlet has a rectangular cross-section.

6. The light-providing device as claimed in claim 1, wherein the LED is an ultraviolet LED or a blue LED.

7. The light-providing device as claimed in claim 1, wherein the phosphors are red phosphors, green phosphors, blue phosphors, or yellow phosphors.

8. A light-providing device, comprising:
   a light guiding member, comprising an opening;
   an LED, disposed on the light guiding member, wherein the light guiding member has a domed structure, and comprises a substrate and a domed cover, wherein the domed cover is connected to the substrate, the opening is formed on the domed cover, and the LED is disposed between the substrate and the domed cover; and
   a light distribution adjusting member, comprising an inlet and an outlet, wherein the inlet is connected to the opening, and the shape or dimensions of the inlet is different from that of the outlet, wherein a plurality of lights generated by the LED enter the light distribution adjusting member through the opening and the inlet, and leave the light distribution adjusting member through the outlet, wherein the lights include a first light angular distribution at the inlet, and include a second light angular distribution at the outlet, and the second light angular distribution/the first light angular distribution is proportional to the inlet/the outlet.

9. The light-providing device as claimed in claim 8, wherein the domed cover has a semicircular cross-section.

10. The light-providing device as claimed in claim 8, wherein the opening is formed on the center of the domed cover, and the LED is disposed on the substrate corresponding to the opening.

11. The light-providing device as claimed in claim 8, wherein the light guiding member further comprises a coated film, disposed on an emitting surface of the LED.

12. The light-providing device as claimed in claim 8, wherein the cross-section area of the outlet is less than that of the inlet.

13. The light-providing device as claimed in claim 8, wherein the outlet has a rectangular cross-section.

14. The light-providing device as claimed in claim 8, wherein the LED is a red LED, a green LED, or a blue LED.

15. A projection system, comprising:
   at least one light-providing device, comprising:
      a light guiding member, comprising an opening;
      an LED, disposed on the light guiding member; and
      a light distribution adjusting member, comprising an inlet and an outlet, wherein the inlet is connected to the opening, and the shape or dimensions of the inlet is different from that of the outlet, wherein a plurality of lights generated by the LED enter the light distribution adjusting member through the opening and the inlet, and leave the light distribution adjusting member through the outlet, wherein the lights include a first light angular distribution at the inlet, and include a second light angular distribution at the outlet, and the second light angular distribution/the first light angular distribution is proportional to the inlet/the outlet;
   a condenser lens;
   a deflecting mirror; and
   an image device, wherein the lights from the light-providing device form a white light, and the white light passes through the condenser lens and forms a plurality of parallel images in the image device by the deflecting mirror.

16. The projection system as claimed in claim 15, further comprising a plurality of light-providing devices and a light combining module, wherein at least one light guiding member has a domed structure, and comprises a substrate and a domed cover connected to the substrate, the opening is formed on the domed cover, and the LED is disposed between the substrate and the domed cover, wherein the lights from the light-providing devices are mixed to the white light by the combining module.

17. The projection system as claimed in claim 16, wherein the light combining module comprises an X-cube.

18. The projection system as claimed in claim 15, wherein the image device comprises a Philips prism and a plurality of digital micromirror devices.

19. A projection system, comprising:
   a plurality of light-providing devices as claimed in claim 1;
   a light combining module;
   a condenser lens;
   a deflecting mirror; and
   an image device, wherein the lights from the light-providing devices form a white light, and the white light passes through the condenser lens and forms a plurality of parallel images in the image device by the deflecting mirror.

20. A projection system, comprising:
a plurality of light-providing devices as claimed in claim 8;
a light combining module;
a condenser lens;
a deflecting mirror; and
an image device, wherein the lights from the light-providing devices form a white light by the light combining module, and the white light passes through the condenser lens and forms a plurality of parallel images in the image device by the deflecting mirror.

* * * * *